Figure 1:
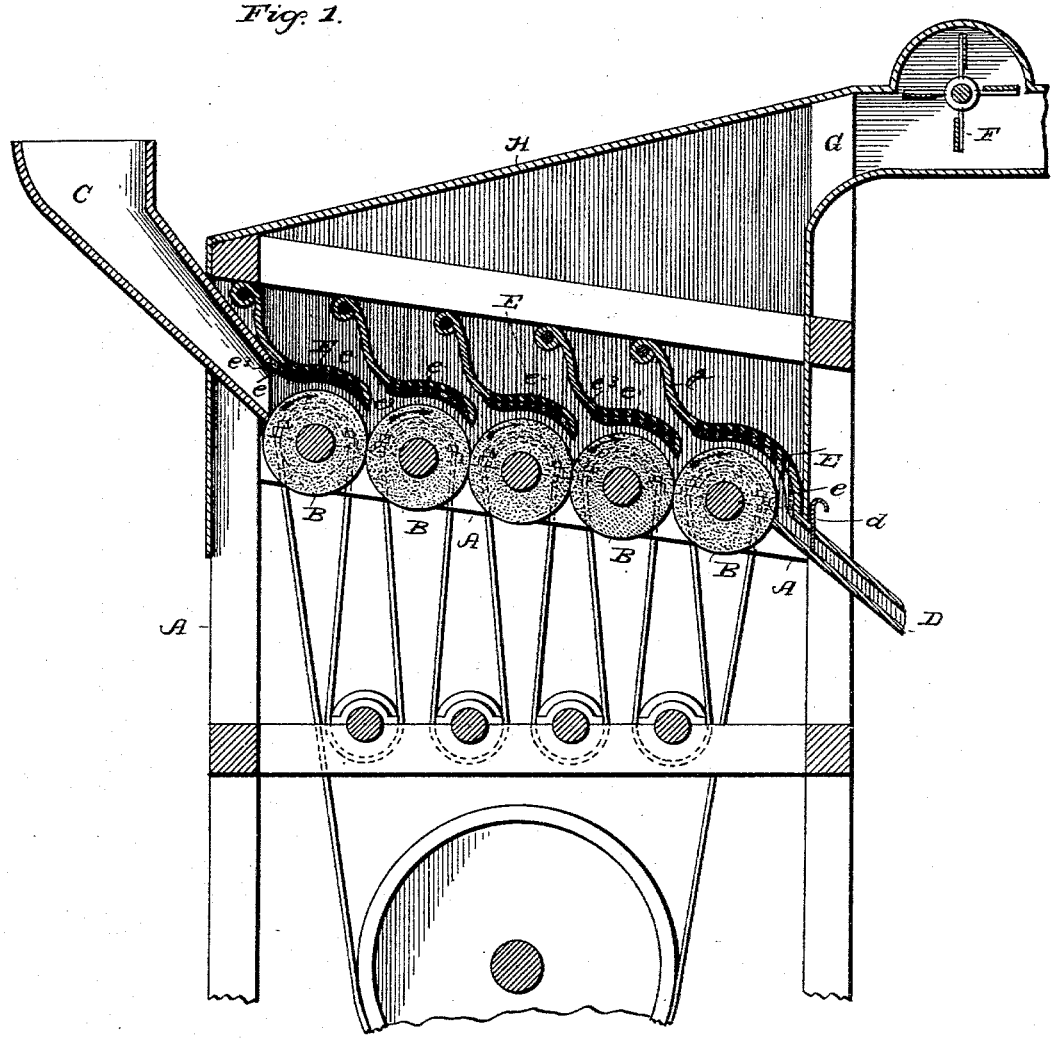

(No Model.)

J. J. FAULKNER.
COTTON SEED DELINTER.

No. 546,277. Patented Sept. 10, 1895.

Witnesses
Victor J. Evans.
Marie Wilson

Inventor
James J. Faulkner.
By E. W. Markle & Love
Attorneys

UNITED STATES PATENT OFFICE.

JAMES J. FAULKNER, OF MEMPHIS, TENNESSEE, ASSIGNOR, BY DIRECT AND MESNE ASSIGNMENTS, TO THE STANDARD COTTON SEED COMPANY, OF ARKANSAS.

COTTON-SEED DELINTER.

SPECIFICATION forming part of Letters Patent No. 546,277, dated September 10, 1895.

Application filed June 26, 1895. Serial No. 554,128. (No model.)

*To all whom it may concern:*

Be it known that I, JAMES J. FAULKNER, a citizen of the United States, residing at Memphis, in the county of Shelby and State of Tennessee, have invented certain new and useful Improvements in Cotton-Seed Delinters; and I do hereby declare the following to be a full, clear, and exact description of the invention, such as will enable others skilled in the art to which it appertains to make and use the same.

My invention relates to improvements in machines for treating cotton-seed, and particularly to improvements in that class thereof known as "delinters;" and it consists in the improved construction and arrangement of parts which will be hereinafter described, and particularly pointed out in the claims.

In an application for Letters Patent filed by me June 13, 1895, Serial No. 552,686, I have described a cotton-seed delinter in which the removal of the lint from the seed takes place by virtue of an abrading action resulting from feeding the seed into an inclosure formed by a series of positively-actuated rotating abrading-rolls, placed with their surfaces in sufficiently close proximity to prevent passage of seed between adjacent rolls and actuated so as to move in the same direction.

My present invention utilizes the same fundamental principle of action which is embodied in the machine described in the application referred to—namely, that when seed is subjected to the influence of a series of positively-actuated rotating abrading-surfaces, placed with their faces in sufficiently close proximity to prevent passage of seed between adjacent rolls and all moving in the same direction, and means are provided for preventing the seed under treatment from falling out of the range of action of the abrading-surfaces—removal of lint will take place from the resultant scouring which the surface of the seed receives, the lint removed being drawn out of the inclosure in which the abrading action is taking place by the abrading-surfaces as they complete their revolution; but injury to the seed is impossible, because the contiguous faces of the revolving surfaces move in opposite directions.

In my present machine I depart from the circular arrangement of abrading-rolls used in the machine described in the above-referred-to application, and place the rolls in line with each other on a horizontal plane. To hold the seed within the range of action of the rolls, I form a casing for the upper surface of the rolls, so that the seed cannot escape from the abrading action. I further make use of separate casings for the separate rolls, removing the lint in the intervals of the passage of the seed between adjacent casings by an upward air-current. Seed is fed into the machine through an inlet-opening extending across the entire surface of the abrading-rolls. The seed discharge, which takes place at the opposite end of the rolls, extends also over the entire length of the same. The lint is drawn upward by an air-current, which has access to the body of seed at the intervals between the separate casings, and is thus prevented from being carried downward out of the inclosure in which the abrading action is taking place by the abrading-rolls as they complete their revolution. The loose dirt which is usually present with the seed as it is fed into the machine—such as leaves and bolls—being less subject to the influence of the air-current, is drawn out by the rolls as they complete their revolution and discharged below the machine. In this manner the lint is freed from impurities, and the separate products of the machine are graded and obtained at separate points.

My invention is fully described in the drawings which accompany and form a part of this application, in which the same reference-letters refer to the same or corresponding parts, and in which—

Figure 2:
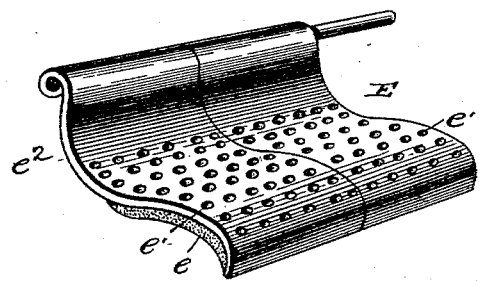

Figure 1 is a central vertical section of my machine, and Fig. 2 is a detail view of one of the segmental casings used in connection with the abrading-rolls.

Referring to the drawings, A represents the machine-frame, in which are formed suitable bearings for the abrading-rolls B. These rolls are placed in horizontal line in the machine, with their surfaces in sufficiently close proximity to prevent passage of seed between adjacent rolls, and are so actuated as to all rotate in the same direction. They are given a slight downward inclination to facilitate the feeding of the seed from the inlet C, which extends across the entire length of the machine to the discharge-opening D. The discharge-opening also extends across the entire length of the machine and is provided with a valve $d$ to control the discharge in accordance with the condition of the seed under treatment. A separate casing E is provided for each one of the abrading-rolls, the casing, preferably, though not necessarily, having an emery lining $e$, and being perforated, as shown at $e'$. The form of casing shown in the drawings is provided with upwardly-bent pieces $e^2$, which are bolted or otherwise secured to the machine-frame.

The intervals between the successive casings occur at the points where the surfaces of adjacent rolls meet. The seed which has been confined in the space between the roll and its casing, as soon as it reaches the opening between the successive casings, naturally spreads open at that point as the pressure upon it is released, and is thus most readily subject to the upward air-current to which it is exposed by the action of the fan F, journaled within the air-flume G. This air-flume is provided with an inclined face H. Its influence extends over the entire series of abrading-rolls, the upward current of air drawing its supply between the meeting faces of adjacent rolls. All the conditions are thus favorable for the efficient and rapid removal of the lint, which has been scoured off the surface of the seed under treatment during its passage over any one of the upward adjacent rolls, and before it passes between the succeeding abrading-roll and the casing therefor. To facilitate the entry of the seed between the respective casings and their rolls the entrance end of the casing is formed with an upward bend $e^3$. The seed thus readily enters the space between the casings and the rolls, and having once entered, is forced through the same without the possibility of escape. The seed is gradually fed to the discharge end G of the machine by reason of the inclination of the abrading-rolls. The coarse dirt, such as leaves and bolls, which are usually present with seed as it is fed to a machine, although ground up by the abrading action which takes place between the abrading-rolls and their respective casings is not drawn upward by the air-current which removes the lint, but because of its greater specific gravity is carried out of the inclosure in which the abrading action is taking place by the abrading-rolls as they complete their revolution.

The operation of my machine is as follows: Seed is fed into the machine through the feed-spout C and is successively subjected to the abrading action of the several rolls before it is finally discharged through the discharge-spout D in quantities regulated by the position of the valve $d$. The feeding of the seed to the discharge end of the machine takes place by reason of the inclination on which the abrading-rolls are placed. The lint which is scoured off the seed under treatment by the abrading action taking place between the emeried surfaces on each roll and its segmental casing, is removed from the mass of seed before it is subjected to the abrading action of the following roll by an upward air-current, which is caused to pass between the several rolls by a suction created by the operation of the fan F, stationed in the air-flume G, and is thus removed from the body of seed before it is again subjected to the action of the abrading-surfaces. The impurities, such as leaves and bolls, which are present with the seed are ground up during the course of the abrading action, but are not carried upward with the lint because of their greater specific gravity. They are, however, drawn out of the inclosure within which the abrading action is taking place by the abrading rolls as they complete their revolution. In this manner all of the products of the machine are separated from each other and are graded in such a manner that they can be separately utilized.

Having thus fully described my invention, what I claim as new, and desire to secure by Letters Patent, is—

1. In a cotton seed delinter, the combination with a series of positively-actuated abrading rolls, placed with their surfaces in sufficiently close proximity to prevent passage of seed between the same, and means for causing said rolls to move in the same direction, of seed inlet and discharge openings, independent casings for the several rolls, and means for removing the lint separated by the action of the machine, substantially as described.

2. In a cotton seed delinter, the combination with a series of positively-actuated rotating abrading rolls, placed with their surfaces in sufficiently close proximity to prevent passage of seed between the same, and means for causing said rolls to rotate in the same direction, of seed inlet and discharge openings, independent casings for the several rolls, and means for causing air currents to issue between adjacent rolls, substantially as described.

3. In a cotton seed delinter, the combination with a series of positively-actuated rotating abrading rolls, placed with their surfaces in sufficiently close proximity to prevent passage of seed between the same, and means for causing said rolls to rotate in the same direction, of seed inlet and discharge openings, independent casings for one face of the several rolls, and means for removing the lint separated by the action of the machine, substantially as described.

4. In a cotton seed delinter, the combination with a series of horizontally-arranged, positively-actuated rotating abrading rolls, placed with their surfaces in sufficiently close proximity to prevent passage of seed between the same, and means for causing said rolls to rotate in the same direction, of seed inlet and discharge openings, independent segmental casings for the upper surface of said rolls, and means for causing air currents to issue between adjacent rolls, substantially as described.

5. In a cotton seed delinter, the combination with a series of horizontally-arranged, positively-actuated rotating abrading rolls, placed with their surfaces in sufficiently close proximity to prevent passage of seed between the same, and means for causing said rolls to rotate in the same direction, of seed inlet and discharge openings, independent perforated segmental casings for the upper surface of said rolls, and means for causing upward air currents to issue between adjacent rolls, substantially as described.

6. In a cotton seed delinter, the combination with a series of horizontally-arranged, positively-actuated rotating abrading rolls, placed with their surfaces in sufficiently close proximity to prevent passage of seed between the same, and means for causing said rolls to rotate in the same direction, of seed inlet and discharge openings, independent segmental casings for the upper surface of said rolls, said casings being lined with an abrading substance, and means for causing upward air currents to issue between adjacent rolls, substantially as described.

7. In a cotton seed delinter, the combination with a series of horizontally-arranged, positively-actuated rotating abrading rolls, placed with their surfaces in sufficiently close proximity to prevent passage of seed between the same, and means for causing said rolls to rotate in the same direction, of seed inlet and discharge openings, independent segmental perforated casings having an abrading lining for the upper surface of said rolls, and means for causing upward air currents to issue between adjacent rolls, substantially as described.

8. In a cotton seed delinter, the combination with a series of horizontally-arranged positively-actuated rotating abrading rolls, placed with their surfaces in sufficiently close proximity to prevent passage of seed between the same, and means for causing said rolls to rotate in the same direction, of seed inlet and discharge openings, independent segmental abrading-surfaced casings for the upper surfaces of said rolls, said casings being formed with an upward bend at the entrance thereof, and means for causing upward air currents to issue between adjacent rolls, substantially as described.

In testimony whereof I affix my signature in presence of two witnesses.

JAMES J. FAULKNER.

Witnesses:
 R. W. RAMSEY,
 JOHN HALLUM.